US010642664B2

(12) United States Patent
Tan et al.

(10) Patent No.: US 10,642,664 B2
(45) Date of Patent: May 5, 2020

(54) SYSTEM AND METHOD FOR SECURING AN INTER-PROCESS COMMUNICATION VIA A NAMED PIPE

(71) Applicant: Dell Products, LP, Round Rock, TX (US)

(72) Inventors: Danilo O. Tan, Austin, TX (US); Mohit Arora, Leander, TX (US)

(73) Assignee: Dell Products, LP, Round Rock, TX (US)

(*) Notice: Subject to any disclaimer, the term of this patent is extended or adjusted under 35 U.S.C. 154(b) by 634 days.

(21) Appl. No.: 15/465,392

(22) Filed: Mar. 21, 2017

(65) Prior Publication Data
US 2018/0278611 A1 Sep. 27, 2018

(51) Int. Cl.
*G06F 9/54* (2006.01)
*H04L 9/00* (2006.01)
(Continued)

(52) U.S. Cl.
CPC .............. *G06F 9/54* (2013.01); *G06F 21/00* (2013.01); *G06F 21/606* (2013.01); *H04L 9/006* (2013.01); *H04L 9/3268* (2013.01); *H04L 67/141* (2013.01)

(58) Field of Classification Search
CPC ..... G06F 21/606; H04L 9/006; H04L 9/3268; H04L 63/08; H04L 63/0807; H04L 63/083; H04L 63/0846; H04L 63/0853
(Continued)

(56) References Cited

U.S. PATENT DOCUMENTS 9,288,225 B1* 3/2016 Fei ..................... H04L 63/1441
9,769,153 B1* 9/2017 Bowen ................ H04L 63/0823
(Continued)

OTHER PUBLICATIONS

Radulescu, Valentin, "Secure Inter-Process Communication" Journal of Mobile, Embedded and Distributed Systems, v. 5, n. 4, pp. 154-161, Dec. 2013, ISSN 2067-4074, Available at: <http://www.jmeds.eu/index.php/jmeds/article/view/Secure_Inter_Process_Communication>.
(Continued)

*Primary Examiner* — Malcolm Cribbs
*Assistant Examiner* — Angela R Holmes
(74) *Attorney, Agent, or Firm* — Prol Intellectual Property Law, PLLC; H. Kenneth Prol (57) ABSTRACT

An information handling system operating a local inter-process communication securing system may comprise a memory and a processor executing machine readable code instructions of the local inter-process communication securing system performing a verification process of a candidate client application to instruct the candidate client application and a server application for which the local inter-process communication securing system acts as an API to establish a first named pipe having an endpoint address randomly generated by the local inter-process communication securing system, to receive a candidate client identification and a randomly generated string of alpha-numeric characters from the server application, and to instruct the server application to establish a first communication session, via the first named pipe, with the candidate client application upon determining the candidate client identification matches an authenticated client identification and that the randomly generated string of alpha-numeric characters is associated with the authenticated client identification, as stored at the local inter-process communication securing system, to verify that the candidate client application is the authenti-
(Continued)

cated client application. Additionally, the authenticated client application may similarly verify a server application by only entering into the first communication session with the server application after receiving verification from a PKI that the server application is associated with a verified PKI certificate having an authentic signature.

20 Claims, 6 Drawing Sheets (51) Int. Cl.
*H04L 9/32* (2006.01)
*G06F 21/00* (2013.01)
*G06F 21/60* (2013.01)
*H04L 29/08* (2006.01)

(58) Field of Classification Search
USPC .......................................................... 713/168
See application file for complete search history.

(56) References Cited

U.S. PATENT DOCUMENTS

2006/0036570 A1\* 2/2006 Schaefer ............. G06F 9/44505
2008/0295112 A1\* 11/2008 Muscarella ........... G06F 21/606
719/313

OTHER PUBLICATIONS

Dickson, Chris, "Exploring the WCF Named Pipe Binding—Part 3," 7 pages, Jun. 2008, Available at: <http://web.archive.org/web/20110825060451/http://blogs.charteris.com/blogs/chrisdi/archive/2008/06/23/exploring-the-wcf-named-pipe-binding-part-3.aspx>. archive.org/web/20110825060451/http://blogs.charteris.com/blogs/chrisdi/archive/2008/06/23/exploring-the-wcf-iamed-pipe-binding-part-3.aspx>.
Microsoft Developer Network, "Programming WCF Security," 5 pages, 2017, Available at: <https://msdn.microsoft.com/en-us/library/ms731925(v=vs.110).aspx>.

\* cited by examiner

SYSTEM AND METHOD FOR SECURING AN INTER-PROCESS COMMUNICATION VIA A NAMED PIPE

FIELD OF THE DISCLOSURE

The present disclosure generally relates to inter-process communications between client applications and server applications operating on the same device, and more specifically, to securing communications via a named pipe inter-process communication channel in order to inhibit access of the server application by a malicious client application and inhibit access of the client application by a malicious server application.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Data security is critical for most businesses and even home computer users. Client information, payment information, personal files, and bank account details can be hard to replace and potentially dangerous if it falls into the wrong hands. Data lost to hackers or malware infections can have very serious consequences. Malicious applications may access such data by posing as a trusted client application that needs to access information on a server application and entering into a communication session with that server application. Similarly, malicious applications may access such data by posing as a trusted server application that may provide needed access to an authenticated client application, and entering into a communication session with that client application. Such a communication session can take place via one of several types of inter-process communications supported by the server application's operating system. Applications within an operating system may use one of several types of methods for achieving an inter-process communication channel (IPCC), including, but not limited to a file method, an asynchronous system trap method, a socket method, a UNIX domain socket method, a message queue method, a pipe method, an anonymous pipe method, a semaphore pipe method, a shared memory method, a message passing method, and/or a memory-mapped file method. Many of these IPCCs allow for direct communication between a server application and a client application having knowledge of the server application's contact information. In other words, once the client application knows the location of the information maintained by the server application, which the client application wishes to access, the client application may simply open a direct line of communication to that information.

Named pipes are another form of IPCC available to operating systems. Named pipes function differently from the above IPCCs in that each named pipe has an endpoint location that may differ from the location of the information maintained by the server application, which the client application wishes to access. For example, a named pipe may have an endpoint address at a given location, and if a client application wishes to communicate with a server application, the client application may open a named pipe having the endpoint address at the given location. The named pipe IPCC may provide a layer of security from malicious applications not available to other IPCC formats by only providing the endpoint address to trusted or authenticated client applications or server applications. Once both named pipes are established, both the client application and server application may decide to engage in a communication session. In such a scenario, the two separate named pipes may be connected to effectively form a single named pipe between the client application and the server application. If either the client application or the server application determines it does not trust the other and does not wish to communicate with a potentially malicious source, it can refuse to engage in the requested communication session, and disconnect its individual named pipe.

In an operating system allowing applications to communicate via named pipes, several methods of "spoofing" may occur. In a first form of "spoofing," a malicious application (either client or server) could eavesdrop on the communication wherein an authenticated application is told the endpoint address of a named pipe. In such a way, a malicious application may circumvent the layer of security from malicious applications not available to other IPCC formats described directly above. For example, a malicious server application could obtain the endpoint address an authenticated server application uses to communicate with authenticated client applications, and could host a communication at that endpoint before the authenticated server application has a chance to host its own communication at that endpoint, thus preventing the authenticated server from using that endpoint to communicate with the authenticated client application.

From the perspective of the server application, any client application that establishes a named pipe having the endpoint location may be authenticated, or may be a malicious client application mimicking the authenticated client application. As such, the server application may view all client applications establishing named pipes having that endpoint address as candidates for authentication, or "candidate client applications," until it can be established that the candidate client application is, in fact, the authenticated client application the candidate client application claims to be.

The present disclosure provides a solution to this first problem in the form of a local inter-process communication securing system. The local inter-process communication securing system protects communications between a server application and a client application across a named pipe by only transmitting the randomly generated endpoint address of the server named pipe to an authenticated client application, and by ensuring the candidate client application that later establishes the connection to the given named pipe having that endpoint address is the authenticated client application to which it transmitted the endpoint address, rather than a malicious client application that eavesdropped on that transmission. The method used by the local inter-process communication securing system of the present disclosure in an embodiment is twofold. In a first embodiment, the local inter-process communication securing system verifies an authenticated client application is associated with a trusted PKI certificate having the requisite threshold privileges required to access the requested information. In an embodiment of the second portion of the two-fold method, the local inter-process communication securing system works in tandem with the server application to ensure that a candidate client application with which the server application is communicating via the named pipe is the same authenticated client application the local inter-process communication securing system has previously verified is associated with a trusted PKI certificate having sufficient privileges by requiring a verification of candidate client applications based on a randomly generated, one-time use token. Thus, the server application and local inter-process communication securing system in an embodiment adds an extra layer of protection against "spoofing" by malicious client applications eavesdropping on communications between the local inter-process communication securing system and the authenticated client application during the verification of the authenticated client application's PKI certificate.

In another form of "spoofing," a malicious application may be associated with a verified PKI certificate having very low privileges that limit its access, but may alter that PKI certificate to reflect higher privileges. As described above, malicious applications may access sensitive data by posing as a trusted client application that needs to access information on a server application that has access to such information. Server applications may only trust client applications from a specific subset of sources, applications having verified Public Key Infrastructure (PKI) certificates, or applications having a certain threshold of privileges associated with a verified PKI certificate. As such, instead of posing as a trusted client application, a malicious application may be associated with a verified PKI certificate, but may alter that certificate to indicate it meets the threshold of privileges required by the server application, when, in fact, it does not. For example, client applications from unverified third parties, suppliers, users, or websites may be associated with authenticated PKI certificates, but may be given very low-level privileges. Such unverified client applications may only be given highly restricted access to the operating system environment, in order to ensure execution of the unverified client application does not harm the host device. This highly restricted access may be referred to as "sandboxing."

In another embodiment of the present disclosure, a solution to this second problem is provided by requiring each authenticated client application to repeat the process described above for each communication session requested with the server application. For example, if an authenticated client application is a "sandboxed" application, the local inter-process communication securing system may allow communications sessions with the server application under very specific circumstances. As such, the local inter-process communication securing system may grant access to the authenticated sandboxed application dependent upon the type of communication session requested. By requiring all authenticated client applications to repeat the process involving the use of randomly generated one-time use tokens, the local inter-process communication securing system may ensure even sandboxed authenticated client applications only access server application information appropriate for their given privilege level.

In yet another form of "spoofing," a malicious server application may pose as an authenticated server application in order to convince an authenticated client application to access false information. In a fourth embodiment of the present disclosure, the local inter-process communication securing system may solve this problem by verifying the digital signature of the server application prior to the authenticated client application requesting to open the communication session with the server application.

Figure 1:
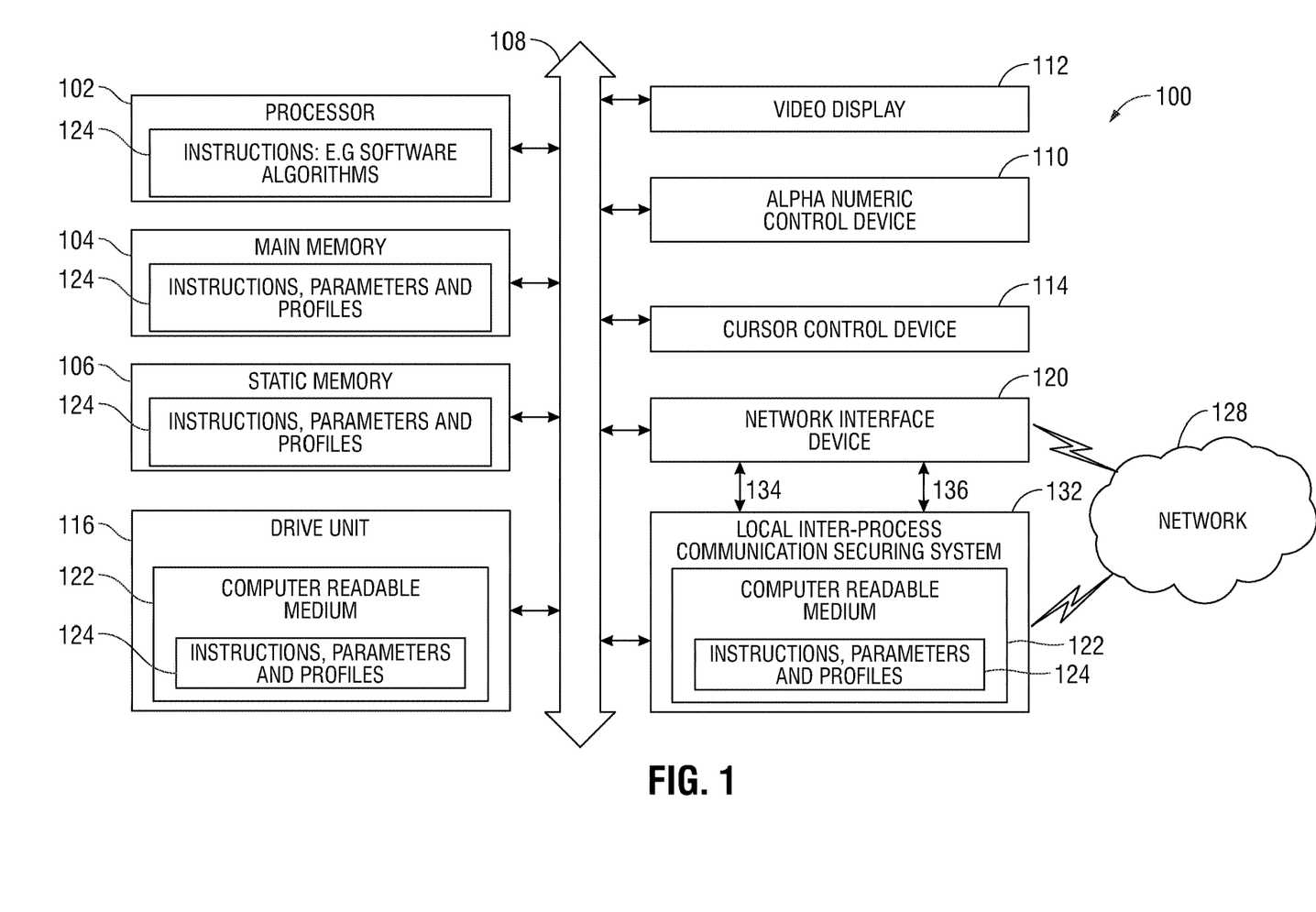
FIG. 1 illustrates a generalized embodiment of an information handling system according to an embodiment of the present disclosure.

FIG. 1 illustrates a generalized embodiment of information handling system 100. As discussed, information handling system 100 can be any type of personal computer, a laptop computer, a smart phone, a tablet device, or other consumer electronic device, a network server, a network storage device, a switch router or other network communication device, or any other suitable device. Information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the local inter-process communication securing system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 112. The video display 112 in an embodiment may function as a liquid crystal display (LCD), an organic light emitting diode (OLED), a flat panel display, a solid state display, or a cathode ray tube (CRT). Additionally, the information handling system 100 may include an alpha numeric input device 110, such as a keyboard, and a cursor control device 114, such as a mouse, touchpad, or gesture or touch screen input.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. In another embodiment, application programs and BIOS/FW code reside in another storage medium of information handling system 100. For example, application programs and BIOS/FW code can reside in static memory 106, drive unit 116, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 116 or in a storage system (not illustrated) associated with network interface device 120 or any combination thereof. Application programs 124, and BIOS/FW code instructions 124 can each be implemented as single programs, or as separate programs carrying out the various features as described herein. Application program interfaces (APIs) such Win 32 API may enable application programs 124 to interact or integrate operations with one another.

In an example of the present disclosure, the processor 102 may execute code instructions 124 of the local inter-process communication securing system 132 as disclosed herein, and an API may enable interaction between the application program and device drivers and other aspects of the information handling system and a local inter-process communication securing system 132 thereon. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The local inter-process communication securing system 132 and the drive unit 116 may include a computer-readable medium 122 such as a magnetic disk in an example embodiment. The computer-readable medium of the main memory 104, static memory 106, drive unit 116, and local inter-process communication securing system 132 may store one or more sets of code instructions 124, such as software code corresponding to the present disclosure. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The local inter-process communication securing system 132 computer readable medium 122 may also contain space for data storage, such as storage of randomly generated tokens received from a server application, client applications identifications received from one or more client applications, randomly generated unique resource identifiers for endpoint addresses of named pipes, and data structures associating client application identifications with randomly generated tokens and randomly generated uniform resource identifications. The information handling system 100 may also include a local inter-process communication securing system 132 that may be operably connected to the bus 108. The local inter-process communication securing system 132 may perform tasks related to verifying an authenticated client application is associated with a trusted PKI certificate having sufficient privileges and verifying a client application that is in communication with a server application via a named pipe having a randomly generated endpoint address is the same client application the local inter-process communication securing system 132 previously determined is associated with a trusted PKI certificate having sufficient privileges and is not a malicious application attempting to mimic the authenticated client application associated with a trusted PKI certificate having sufficient privileges. In an embodiment, the local inter-process communication securing system 132 may communicate with the main memory 104, the processor 102, the video display 112, the alphanumeric input device 110, and the network interface device 120 via bus 108, and several forms of communication may be used, including ACPI, SMBus, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
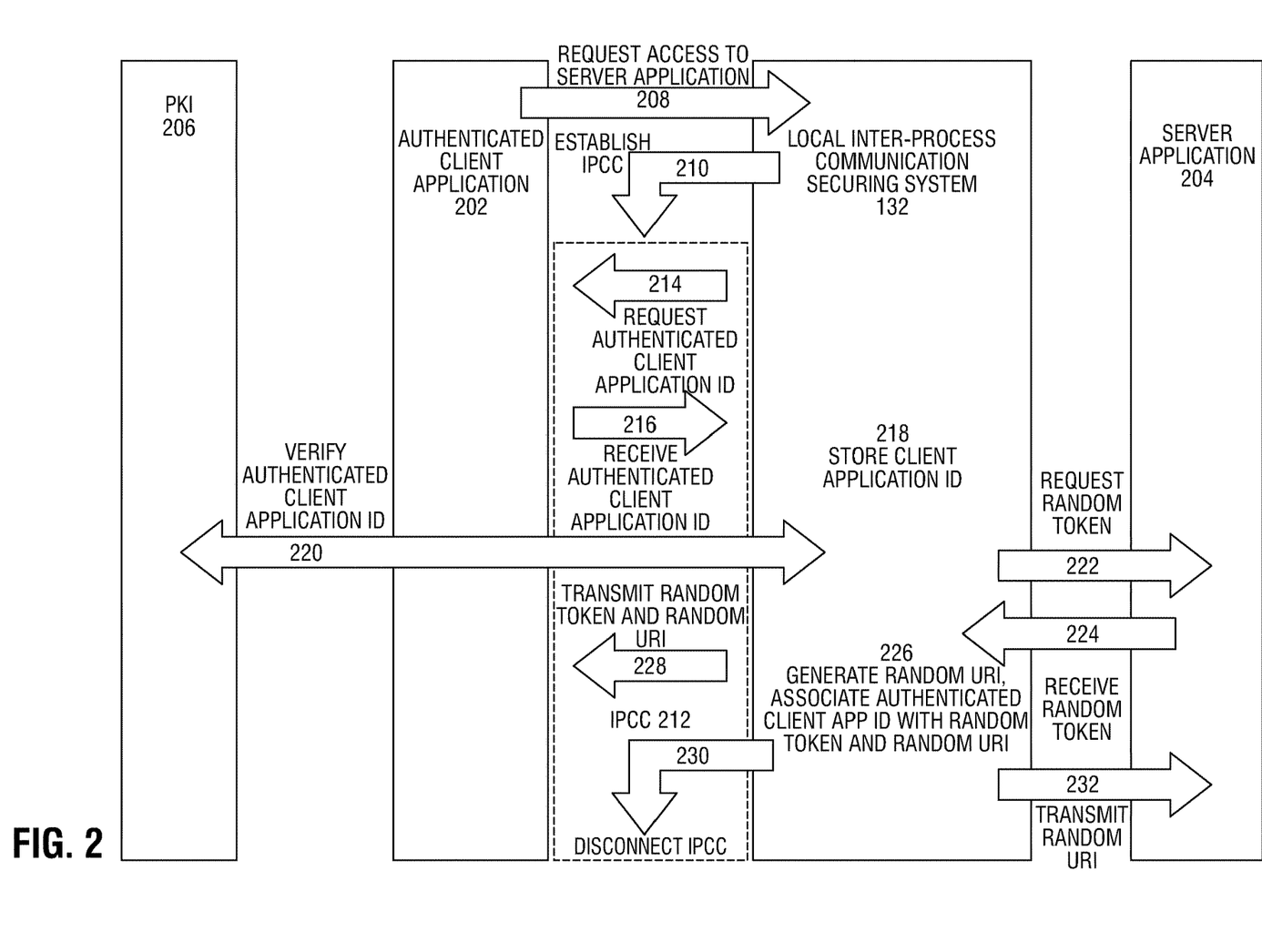
FIG. 2 is a flow diagram illustrating a method of associating a random token with an authorized client application having a trusted Public Key Infrastructure certificate according to an embodiment of the present disclosure.

FIG. 2 is a flow diagram illustrating a method of associating a random token with a client application having a trusted Public Key Infrastructure certificate according to an embodiment of the present disclosure. As shown in FIG. 2, the local inter-process communication securing system 132 in an embodiment may be in inter-process communication with an authenticated client application 202, a server application 204, and a public key infrastructure (PKI) 206. The local inter-process communication securing system 132 in an embodiment may function as an Application Platform Interface (API) directing connectivity between the authenticated client application 202 and the server application 204 that may provide resources or services to the authenticated client application 202.

In an embodiment, the authenticated client application 202 may be any application that requests services or resources from the server application 204 for which the local inter-process communication securing system 132 operates as an API. The authenticated client application 202 may operate within the same information handling system as the local inter-process communication securing system 132 and the server application 204.

Further, the authenticated client application 202 may be an application the local inter-process communication securing system 132 recognizes as trusted, and tested, or from a verified third party, or may be an application the local inter-process communication securing system 132 does not recognize as trusted, tested, or from a verified third party. Without use of the local inter-process communication securing system 132, client applications not immediately recognized as trusted, tested, or from a verified third party in an embodiment may be "sandboxed," or only able to access a strictly controlled set of resources, such as a scratch space on disk and memory. Further, if the authenticated client application 202 is sandboxed, without the use of the local inter-process communication securing system 132, the authenticated client application 202 network access and ability to inspect the server application or read from input devices may be disallowed or heavily restricted.

The PKI 206 in an embodiment may be machine-readable executable code instructions for a set of roles, policies, and procedures needed to create, manage, distribute, use, store, and revoke digital certificates and manage public-key encryption. The purpose of the PKI 206 in an embodiment may be to facilitate the secure electronic transfer of information for a range of network activities where simple passwords are an inadequate authentication method and more rigorous proof is needed to confirm the identity of the parties involved in the communication and to validate the information being transmitted. The PKI 206 in an embodiment may also be an arrangement that binds public keys with respective identities of entities (like persons and organizations). The binding in an embodiment may be established through a process of registration and issuance of certificates at and by a certificate authority residing within the PKI 206. As an example, the PKI 206 may operate to issue a trusted PKI certificate having sufficient privileges to the authenticated client application 202, the server application 204, or to other client/server applications, once it identifies those applications as having been generated by a trusted source. Alternatively, and as another example, the PKI 206 may refuse to issue a trusted PKI certificate having sufficient privileges to an application from a source the PKI does not recognize as trusted, or to a "sandboxed" authenticated client application. For purposes of this disclosure, it is assumed the authenticated client application 202 and server application 204 have communicated with the PKI 206, and the PKI 206 has either granted or refused a trusted certificate to the authenticated client application 202 and/or the server application 204, in response.

The PKI 206 in an embodiment may further include one or more of: (1) a certificate authority that may store, issue, and sign digital certificates; (2) a registration authority that may verify the identity of entities requesting their digital certificates to be stored at the certificate authority; (3) a central directory that may provide a secure location in which to store and index keys; and/or (4) a certificate management system that may manage the access to stored certificates or the delivery of the certificates to be issued. The PKI 206 in an embodiment may operate within the same information handling system as the local inter-process communication securing system 132 and the server application 204, or may operate outside the information handling system as a stand-alone device, or may be connected, such as via a network, to the local inter-process communication securing system 132.

At arrow 208, the authenticated client application 202 may transmit a request for access to the server application 204 to the local inter-process communication securing system 132. The request for access to the server application 204 may be transmitted to the local inter-process communication securing system 132 using any inter-process communication mechanism allowed by the operating system of the information handling system, including, but not limited to, a socket connection, a pipe, or a named pipe. The authenticated client application 202 may have all information it needs in order to contact the local inter-process communication securing system 132, but may not have information needed to access the server application 204. As an example, in an embodiment in which the operating system allows applications to communicate using a socket connection, the port for the server application 204 may not be known a priori, but the port for the local inter-process communication securing system 132 may be pre-shared. In such an embodiment, the authenticated client application 202 may not be capable of transmitting a request directly to the server application 204 because it does not have access to the port address of the server application 204. Further, in such an embodiment, the authenticated client application 202 may need to address all requests for access to the server application 204 to the local inter-process communication securing system 132, because the authenticated client application 202 knows the port address for the local inter-process communication securing system 132, and the local inter-process communication securing system 132 is a known API for the server application 204.

As another example, in an embodiment in which the operating system allows applications to communicate using a named pipe connection, the endpoint URI or endpoint address for the named pipe that allows communication with the server application 204 may not be known a priori, but the endpoint URI for the named pipe that allows communication with the local inter-process communication securing system 132 may be pre-shared. In such an embodiment, the authenticated client application 202 may not be capable of transmitting a request directly to the server application 204 because it does not have access to the endpoint URI for the named pipe that allows communication with the server application 204. Further, in such an embodiment, the authenticated client application 202 may need to address all requests for access to the server application 204 to the local inter-process communication securing system 132, because the authenticated client application 202 knows the endpoint URI for the named pipe that allows communication with the local inter-process communication securing system 132, and the local inter-process communication securing system 132 is a known API for the server application 204. By controlling the client application's 202 access or knowledge of the port address of a socket connection or endpoint URI for a named pipe, the local inter-process communication securing system 132 may control the client application's 202 ability to communicate through that IPCC channel with any server application for which the local inter-process communication securing system 132 acts as an API.

At arrow 210, in an embodiment, in response to the request for access to the server application 204, the local inter-process communication securing system 132 may establish an IPCC 212 with the authenticated client application 202. As described above, IPCCs refer to the mechanisms an operating system provides to allow processes it manages to share data. Typically, an authenticated client application 202 can use an IPCC to establish communication with a server application 204, and to request and receive data from the server application. A local inter-process communication securing system 132 in an embodiment may use any one of the IPCCs supported by the Windows Communication Foundation for achieving inter-process communication, including, but not limited to a file method, an asynchronous system trap method, a socket method, a UNIX domain socket method, a message queue method, a pipe method, an anonymous pipe method, a named pipe method, a semaphore pipe method, a shared memory method, a message passing method, and/or a memory-mapped file method. For example, the local inter-process communication securing system 132 in an embodiment may establish an IPCC 212 using a socket method, in which the authenticated client application 202 connects to the security port of the local inter-process communication securing system 132 using TCP/IP.

As another example, the local inter-process communication securing system 132 in an embodiment may establish an IPCC 212 using a named pipe method, in which a bidirectional data channel is implemented through a file on a file system accessible by the authenticated client application 202. In such an embodiment, each named pipe may be placed in the root directory of the named pipe file system (NPFS), and given a unique path name. The unique path name of a named pipe in an embodiment may comprise an endpoint address of the named pipe, such as a unique resource identifier (URI). Unique resource identifiers in an embodiment may comprise any string of characters used to identify a resource, and may explicitly include, but may not be limited to uniform resource locators (URLs).

At arrow 214, in an embodiment, the local inter-process communication securing system 132 may transmit, via the IPCC 212, a request for the authenticated client application ID to the authenticated client application 202. The local inter-process communication securing system 132 may use the authenticated client application ID in order to verify the authenticated client application 202 is associated with a trusted PKI certificate having sufficient privileges.

At arrow 216, in an embodiment, the authenticated client application 202 may transmit, via the IPCC 212, the authenticated client application identification and a request for a communication session with the server application for which the local inter-process communication securing system 132 acts as an API. The authenticated client application identification in an embodiment may include a PKI digital certificate having sufficient privileges associated with the authenticated client application 202.

At 218, in an embodiment, the local inter-process communication securing system 132 may store the authenticated client application identification received at arrow 216. The authenticated client application identification may be stored in main memory, at a drive unit, or within a computer readable medium of the local inter-process communication securing system 132.

At arrow 220, in an embodiment, the local inter-process communication securing system 132 may verify the authenticated client application identification is a valid certificate issued to a "trusted" source. A "trusted" source in this context may include sources trusted by the PKI, and not necessarily sources "trusted" by the local inter-process communication securing system 132. The local inter-process communication securing system 132 may also determine whether the certificate has expired, to whom it was issued, and whether the certificate has been altered or tampered with. Once verification is complete, the PKI may send a message to the local inter-process communication securing system 132 indicating the authenticated client application identification is associated with a valid certificate of a "trusted" source.

At arrow 222, in an embodiment, the local inter-process communication securing system 132 may transmit a request for a random token to the server application 204. A random token may be generated by the server application 204, and may be a string of randomly chosen characters. The local inter-process communication securing system 132 and server application 204 may later use the randomly generated token to verify that the server application 204 is granting access to the same authenticated client application 202 whose PKI certificate the local inter-process communication securing system 132 verified as coming from a "trusted" source having sufficient privileges, as described in greater detail below. As described above, malicious client applications may attempt to access the server application 204 by mimicking the authenticated client application 202 associated with the authenticated and trusted PKI certificate having sufficient privileges. This is otherwise known as "spoofing." As also described above, the server application 204 and local inter-process communication securing system 132 in an embodiment may operate to inhibit "spoofing" by malicious client applications eavesdropping on communications between the local inter-process communication securing system 132 and the authenticated client application 202 via the first IPCC. A malicious application could eavesdrop on a communication between an authenticated client application 202 and the local inter-process communication securing system 132, and as a result of that eavesdropping, engineer a way of accessing the server application 204 itself by circumventing existing authentication methods. For example, a malicious application could lift hard-coded keys from the binary, reverse engineer a key generation algorithm, or employ a method of reverse obfuscation. The local inter-process communication securing system 132 in an embodiment may inhibit the ability of malicious applications to spoof by requiring each candidate client application to verify, via the one-time use random token generated by the server application 204, that the candidate client application is the authenticated client application 202.

At arrow 224, the local inter-process communication securing system 132 may receive the random token generated by the server application 204, in response to the request for the random token made at arrow 222. By receiving the random token, the local inter-process communication securing system 132 may later act as a verifying entity for a candidate client application, independent from the server application 204.

At 226, the local inter-process communication securing system 132 may store the random token in memory. The random token may be stored in main memory, at a drive unit, or within a computer readable medium of the local inter-process communication securing system 132. Also at 226, the local inter-process communication securing system 132 may generate a random URI for a named pipe, store the random URI in memory, and associate the authenticated client application identification received at arrow 216 with the random token received at arrow 224, and with the random URI. This may allow the local inter-process communication securing system 132 to later ensure any communication sessions between a candidate client application and server application 204 on a named pipe having the stored random URI endpoint address only occurs if the candidate client application transmits the authenticated client application ID and random token associated with the random URI as stored at the local inter-process communication securing system 132.

At arrow 228, the local inter-process communication securing system 132 may transmit the random token it received from the server application 204 at arrow 224, and the random URI the local inter-process communication securing system 132 generated at 226 to the authenticated client application 202 via the IPCC 212. The authenticated client application 202 may use the random token to later verify its identity via a named pipe having the random URI as an endpoint address. At arrow 230, the local inter-process communication securing system 132 may disconnect the IPCC 212 and cease communications with the authenticated client application 202. Once the local inter-process communication securing system 132 has verified the authenticity of the authenticated client application 202's PKI certificate, and transmitted the randomly generated token and randomly generated URI to the authenticated client application 202, the local inter-process communication securing system 132 may disconnect the IPCC 212, leaving the authenticated client application 202 to establish a named pipe with the server application, and verify its authenticity a second time, before engaging in the requested communication session with the server application 204.

At arrow 232, the local inter-process communication securing system 132 may transmit the random URI to the server application 204. As described in greater detail below, if the authenticated client application 202 and the server application 204 both open named pipe connections between themselves and the endpoint address of the random URI, the authenticated client application 202 and the server application 204 may effectively create a named pipe between themselves.

Figure 3:
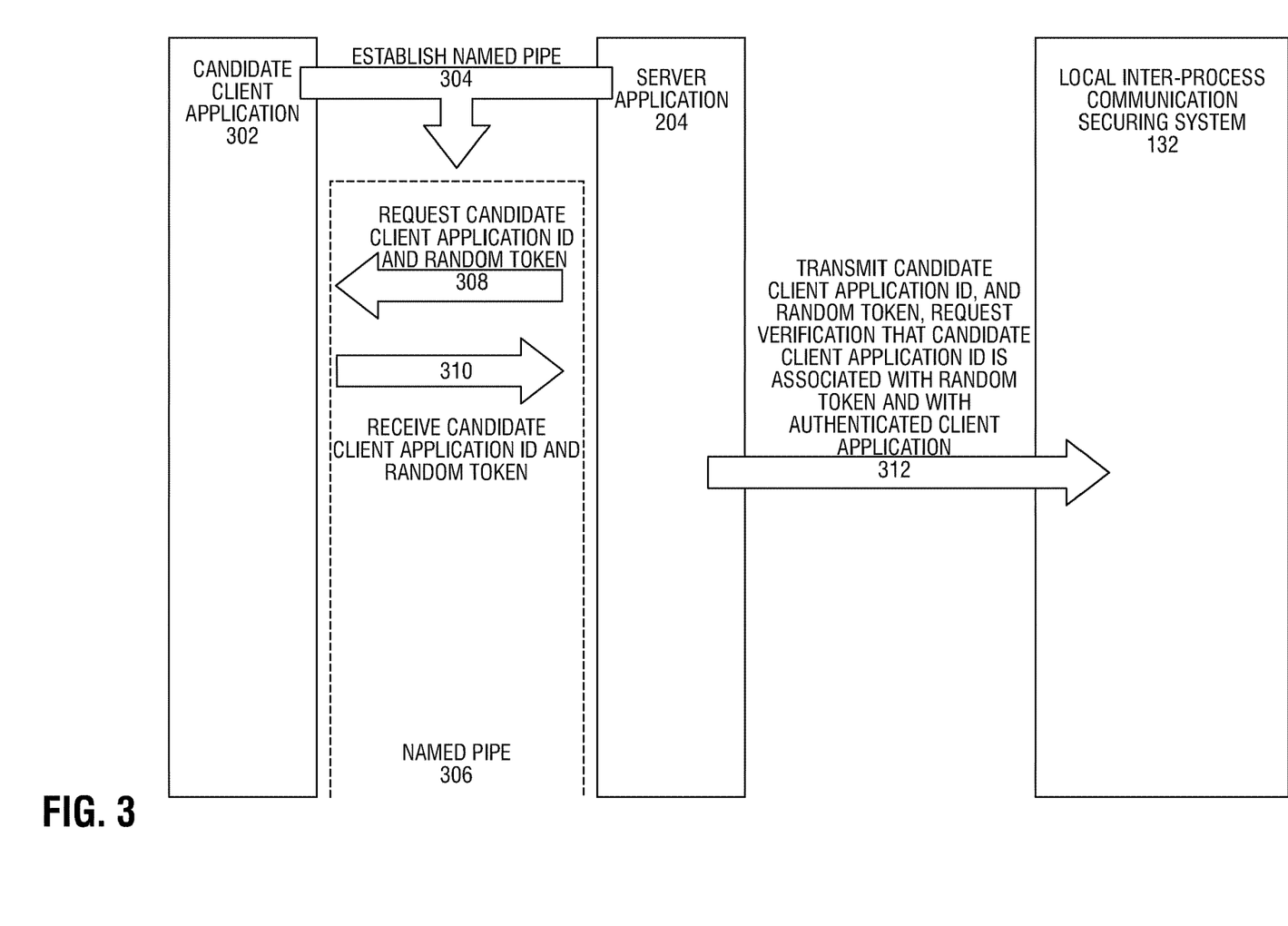
FIG. 3 is a flow diagram illustrating a method of a server application requesting verification of a candidate client application with which it is communicating according to an embodiment of the present disclosure.

FIG. 3 is a flow diagram illustrating a method of the server application requesting verification of a candidate client application with which it is communicating in a named pipe. As shown at arrow 304, in an embodiment, and as described directly above, a candidate client application 302 may open a named pipe having an endpoint address at the randomly generated URI transmitted to the authenticated client application. As also described above, the candidate client application 302 could be the authenticated client application, or could be a malicious "spoofing" client application hat overheard the randomly generated URI while eavesdropping on communications between the local inter-process communication securing system and the authenticated client application.

The server application 204 may open another named pipe having an endpoint address at the randomly generated URI. As described above, these two named pipes, once connected to one another, may effectively form a two-way communication channel, or named pipe 304, directly between the candidate client application 302 and the server application 204. As also described above, the server application 204 and local inter-process communication securing system 132 in an embodiment may operate to inhibit "spoofing" by malicious client applications eavesdropping on communications between the local inter-process communication securing system 132 and the authenticated client application via the first IPCC by requiring the candidate client application 302 to verify via a one-time use randomly generated token that it is the same authenticated client application the local inter-process communication securing system 132 previously determined is associated with a trusted PKI certificate having sufficient privileges to access the requested information.

At arrow 308, in an embodiment, the server application 204 may request the candidate client application ID and the random token from the candidate client application 302. As described above, the local inter-process communication securing system 132 in an embodiment may have previously transmitted both the authenticated client application ID and the random token to the authenticated client application. At arrow 310, in an embodiment, the candidate client application 302 may respond to this request by transmitting the candidate client application ID and random token to the server application 204 via the named pipe 304. In such a way, if the candidate client application ID matches the authenticated client application ID and the random token transmitted at arrow 3410 is associated with the authenticated client application ID, as stored at the local inter-process communication securing system, the candidate client application 302 may verify it is the same authenticated client application the local inter-process communication securing system 132 previously determined is associated with a trusted PKI certificate having the requisite privileges.

At arrow 312, the server application 204 in an embodiment may transmit the received candidate client application ID, and the random token, and request verification from the local inter-process communication securing system 132 that the candidate client application ID it received at arrow 310 matches the authenticated client application ID, and that the authenticated client application ID is properly associated with the random token it also received at arrow 310. Confirmation that the candidate client application ID matches the authenticated client application ID and the authenticated client application ID is properly associated with the random token in an embodiment may verify that the candidate client application 302 with which the server application 204 is currently communicating via the named pipe 304 is the same authenticated client application the local inter-process communication securing system 132 previously confirmed was associated with an authentic PKI certificate having sufficient privileges.

Figure 4:
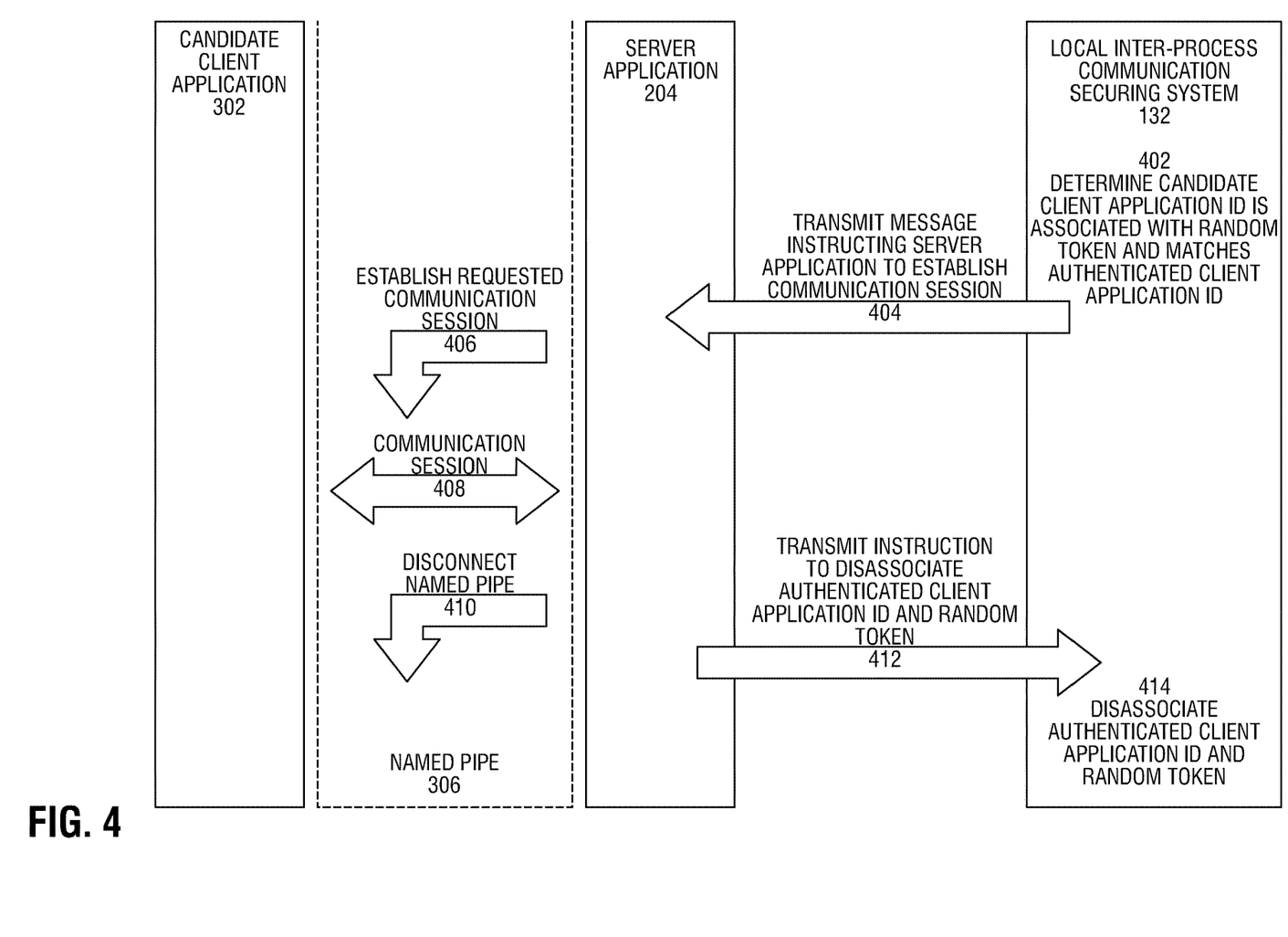
FIG. 4 is a flow diagram illustrating a server application initiating a communication session with an authenticated client application according to an embodiment of the present disclosure.

FIG. 4 is a flow diagram illustrating the server application initiating a communication session with an authenticated client application. As shown in FIG. 4, at 402, the local inter-process communication securing system 132 in an embodiment may determine the candidate client application ID matches the authenticated client application ID and the authenticated client application ID is associated with the random token. As described above with reference to FIG. 2, the local inter-process communication securing system 132 in an embodiment may have associated the authenticated client application ID it received from the authenticated client application 202 with a one-time use random token it received from the server application 204. The local inter-process communication securing system 132 may determine the candidate client application ID matches the authenticated client application ID and the authenticated client application ID is associated with the random token it received from the server application 204. In such a way, the local inter-process communication securing system 132 in an embodiment may determine the server application 204 is communicating via the named pipe 304 with the same authenticated client application the local inter-process communication securing system 132 previously confirmed is associated with a trusted PKI certificate having sufficient privileges. In other words, the local inter-process communication securing system 132 may confirm the candidate client application 302 and the authenticated client application 202 are the same client application. Alternatively, and as described in greater detail below, the local inter-process communication securing system 132 may determine the server application 204 is communicating via the named pipe 304 with a candidate client application 302 that is not the authenticated client application the local inter-process communication securing system 132 previously confirmed is associated with a trusted PKI certificate having sufficient privileges.

At arrow 404, in an embodiment, the local inter-process communication securing system 132 may transmit a message to the server application 204 instructing it to engage in the requested communication session. At arrow 406, the server application 204 may establish the requested communication session 408. As discussed above, the authenticated client application may have requested a communication session with the server application 204 in order for the server application 204 to provide requested services or information to the authenticated client application. The server application 204 may establish this requested communication session 408 in an embodiment only after verifying at arrow 404 that the candidate client application 302 is associated with a valid PKI certificate having sufficient privileges, as determined by the local inter-process communication securing system 132. In such a way, the server application 204 works in tandem with the local inter-process communication securing system 132 to ensure the server application 204 only grants access to client applications that are verified as trusted.

At arrow 410, in an embodiment, once the communication session 408 is complete, and the candidate client application 302 has received all requested services and/or information from the server application 204, the server application 204 may disconnect the named pipe 304. If the candidate client application 302 or any other client application requests a second communication session with the server, such client application must first contact the local inter-process communication securing system 132 again, starting with arrow 208 in FIG. 2. At arrow 412, the server application 204 in an embodiment may transmit instructions to disassociate the authenticated client application ID and the random token to the local inter-process communication securing system 132. At 414, the local inter-process communication securing system 132 in an embodiment may respond by disassociating the authenticated client application ID and the random token.

As described above, in a second form of "spoofing," a malicious application may be associated with a verified PKI certificate having very low privileges that limit its access, but may alter that PKI certificate to reflect higher privileges. For example, "sandboxed" client applications from unverified third parties, suppliers, users, or websites may be associated with authenticated PKI certificates, but may be given very low-level privileges that only allow for highly restricted access to the operating system environment. Because the process involves the one-time use random token, requiring client applications to repeat that process beginning at arrow 208 in FIG. 2 for each requested communication session, the local inter-process communication securing system may limit access of sandboxed authenticated client applications on a case by case basis, depending on the type of information the client application wishes to access within the communication session. Further, in much the same way changing passwords routinely increases security, forcing the candidate client application 302 to prove its authenticity each time it requests services or information from the server application 204 decreases the opportunities for a "spoofer" or potentially malicious client application to access the information or services of the server application 204.

Figure 5:
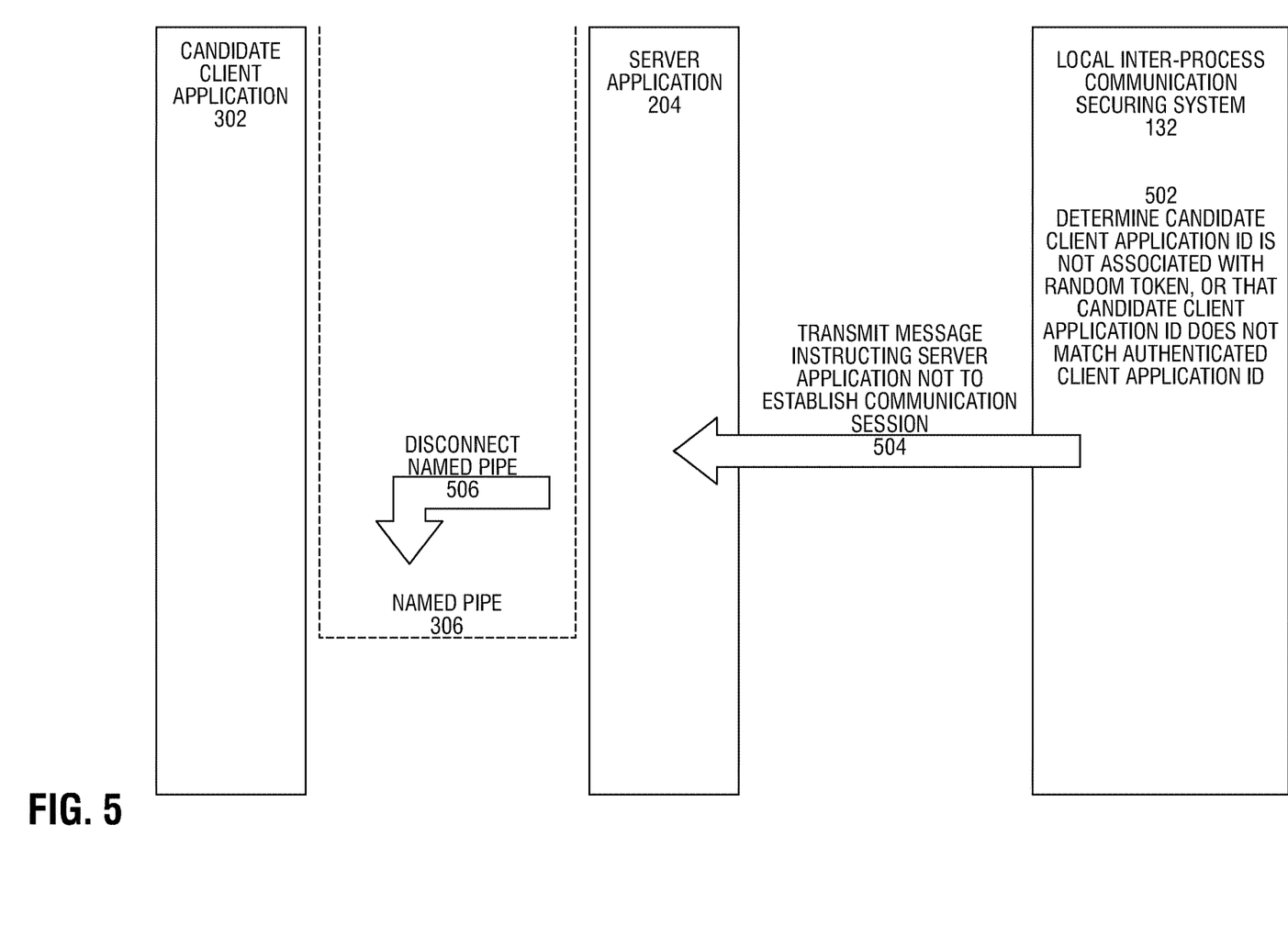
FIG. 5 is a flow diagram illustrating a method of a server application refusing a request for a communication session from an unverified candidate client application according to an embodiment of the present disclosure.

FIG. 5 is a flow diagram illustrating a method of the server application refusing a request for a communication session from an unverified client application, according to an embodiment of the present disclosure. At arrow 502, in an embodiment, the local inter-process communication securing system 132 may determine the candidate client application ID either does not match the authenticated client application ID, or that the authenticated client application is not associated with the random token received from the server. In other words, the local inter-process communication securing system 132 may determine the server application 204 is communicating via the named pipe 304 with a different candidate client application 302 than the authenticated client application the local inter-process communication securing system 132 previously confirmed is associated with a trusted PKI certificate having sufficient privileges. In other words, the candidate client application 302 may be a malicious application attempting to "spoof" the server application 204 in order to gain access to its information or services. Alternatively, the candidate client application 302 may be a sandboxed authenticated client application, but may not have the privileges necessary to access the requested information from the server application 204.

At arrow 504, the local inter-process communication securing system 132 may transmit a message to the server application 204 instructing the server application 204 not to establish the requested communication session with the candidate client application 302. At arrow 506, in response to the message transmitted at arrow 504, the server application 204 in an embodiment may immediately disconnect the named pipe 304, and not establish the requested communication session. In such a way, the server application 204 may avoid allowing the "spoofing" and potentially malicious candidate client applications access to its information and/or services. In such a way, the server application 204 may also avoid allowing authenticated but sandboxed client applications to access to restricted information maintained by the server application 204 which the sandboxed authenticated client application is not authorized to access.

Figure 6:
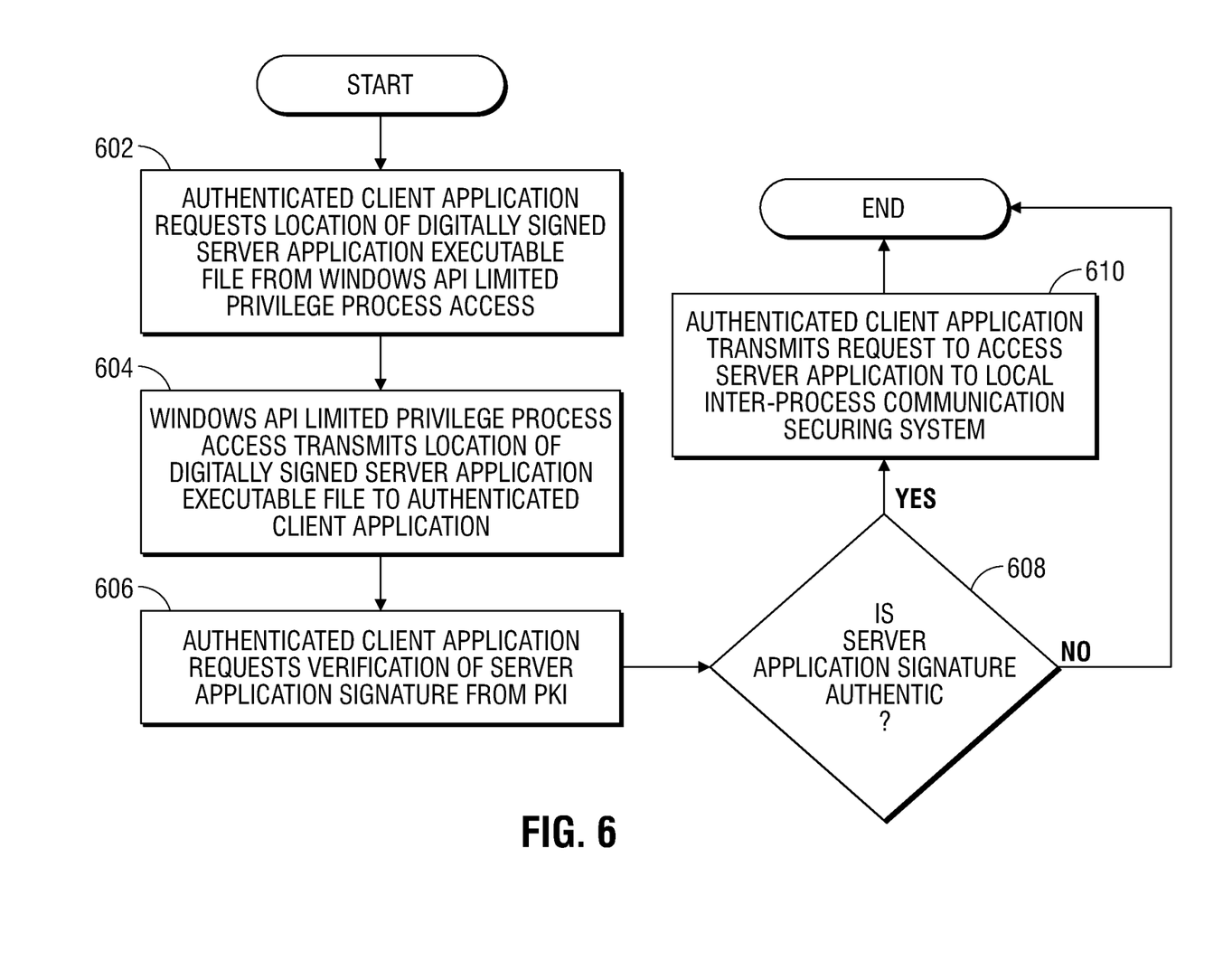
FIG. 6 is a flow diagram illustrating a method of requesting a communication session with an authenticated server application according to an embodiment of the present disclosure.

FIG. 6 is a flow diagram illustrating a method of authenticating a server application according to an embodiment of the present disclosure. As discussed above, in a third form of "spoofing," a malicious server application may pose as an authenticated server application in order to convince an authenticated client application to access false information. The method depicted in FIG. 6 avoids this issue by allowing the client application to authenticate the server application before the client application sends a request to access the server application to the local inter-process communication securing system, as described above in FIG. 2, at arrow 208. At block 602, in an embodiment, the authenticated client application may request a location of a digitally signed executable file for the server application the authenticated client application wishes to access from a Windows API limited privilege process access. As described above, without use of the local inter-process communication securing system, client applications not immediately recognized as trusted, tested, or from a verified third party in an embodiment may be "sandboxed," or only able to access a strictly controlled set of resources, such as a scratch space on disk and memory. "Sandboxed" applications may have access to the limited information available through the Windows API limited privilege process access. As shown in FIG. 6, at block 602, the authenticated client application may request all information pertaining to the server application via this limited privilege access.

At block 604, in an embodiment, the Windows API limited privilege process access may transmit the location of a digitally signed server application executable file to the authenticated client application. Transmitting the location of the digitally signed server application executable file to the authenticated client application in an embodiment may include transmitting a file path name, a socket port, an endpoint address for a named pipe, or any other information the authenticated client application may use in order to establish an inter-process communication channel supported by the operating system and established by the Windows Communication Foundation between the authenticated client application and the location of the server application executable file.

At block 606, the authenticated client application in an embodiment may request verification of the server application signature from the PKI. In an embodiment, once the authenticated client application has accessed the digitally signed server application executable file, it may communicate with a PKI to determine whether the digital signature is authentic, or with which party the digital signature is associated.

For example, the authenticated client application may transmit the digital signature to the PKI, which may determine whether the digital signature is associated with a valid and trusted PKI certificate having sufficient privileges. In this example, the client application may determine whether the server application executable file is signed by a trusted source, whether the signature of a trusted source has been "forged," or whether the executable file is not associated with the digital signature of a trusted source.

At block 608, the authenticated client application and the PKI may work in tandem, in an embodiment, to determine whether the server application signature is authentic and from a trusted or specific source. For example, the PKI may determine whether the digital signature is associated with a valid and trusted PKI certificate by using the public key associated with the digital signature to validate the signature.

At block 610, in an embodiment, if the server application digital signature is authentic, the authenticated client application may transmit a request to access the server application to the local inter-process communication securing system. Alternatively, if the authenticated client application and/or the PKI determine the digital signature of a trusted source has been "forged," or that the executable file is not associated with the digital signature of a trusted source, the authenticated client application may not transmit a request to access the server application. As described above, by only requesting access to the server application after determining the server application digital signature is authentic, the authenticated client application may avoid accessing false information provided by a malicious server application attempting to mimic a trusted server application. Once the digital signature of the server application is verified, however, the authenticated client application may send a request to access the server application to the local inter-process communication securing system, as described above in FIG. 2, at arrow 208.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a local inter-process communication securing system comprising:
    a memory;
    a processor executing machine readable code instructions of the local inter-process communication securing system performing a verification process of a candidate client application to:
        instruct the candidate client application and a server application for which the local inter-process communication securing system acts as an API to establish a first named pipe having an endpoint address randomly generated by the local inter-process communication securing system;

receive a candidate client identification and a first randomly generated string of alpha-numeric characters from the server application; and instruct the server application to establish a first communication session, via the first named pipe, with the candidate client application upon determining the candidate client identification matches an authenticated client identification and that the first randomly generated string of alpha-numeric characters matches a second randomly generated string of alpha-numeric characters previously transmitted to an authenticated client application, as stored at the local inter-process communication securing system, to verify that the candidate client application is the authenticated client application.

2. The information handling system operating the local inter-process communication securing system of claim 1 further comprising the processor executing machine readable code instructions of the local inter-process communication securing system to instruct the server application to immediately disconnect the first named pipe upon determining the candidate client identification either does not match the authenticated client identification or that the first randomly generated string of alpha-numeric characters does not match the second randomly generated string of alpha-numeric characters, as stored at the local inter-process communication securing system.

3. The information handling system operating the local inter-process communication securing system of claim 1 further comprising the processor executing machine-readable executable code instructions of the local inter-process communication securing system to:

receive from the authenticated client application associated with a trusted public key infrastructure certificate via an inter-process communication channel, the authenticated client identification;

associate the authenticated client identification with the second randomly generated string of alpha-numeric characters previously received from the server application, and the randomly generated endpoint address of the first named pipe; and transmit the randomly generated endpoint address to the server application and the authenticated client application and transmit the second randomly generated string of alpha-numeric characters to the authenticated client application.

4. The information handling system operating the local inter-process communication securing system of claim 1 further comprising the processor executing machine readable code instructions of the local inter-process communication securing system to repeat the verification process of the candidate client application upon receiving a request from the candidate client application for a second communication session with the server application.

5. The information handling system operating the local inter-process communication securing system of claim 3 wherein the inter-process communication channel is a socket connection.

6. The information handling system operating the local inter-process communication securing system of claim 1 wherein the authenticated client application only enters into the first communication session with the server application after receiving verification from a PKI that the server application is associated with a verified PKI certificate having an authentic signature.

7. The information handling system operating the local inter-process communication securing system of claim 1 wherein the candidate client application code instructions are executed in a restricted operating system environment.

8. An method of securing a local inter-process communication by performing a verification process of a candidate client application comprising:

instructing a candidate client application and a server application for which a local inter-process communication securing system acts as an API to establish a first named pipe having an endpoint address randomly generated by the local inter-process communication securing system;

receiving a candidate client identification and a first randomly generated string of alpha-numeric characters from the server application; and instructing the server application to establish a first communication session, via the first named pipe, with the candidate client application upon determining the candidate client identification matches an authenticated client identification and that the first randomly generated string of alpha-numeric characters matches a second randomly generated string of alpha-numeric characters previously transmitted to an authenticated client application, as stored at the local inter-process communication securing system, to verify that the candidate client application is the authenticated client application.

9. The method of securing a local inter-process communication by performing a verification process of a candidate client application of claim 8 further comprising instructing the server application to immediately disconnect the first named pipe upon determining the candidate client identification either does not match the authenticated client identification or that the first randomly generated string of alpha-numeric characters does not match a second randomly generated string of alpha-numeric characters previously transmitted to an authenticated client application, as stored at the local inter-process communication securing system.

10. The method of securing a local inter-process communication by performing a verification process of a candidate client application of claim 8 further comprising:

receiving from the authenticated client application associated with a trusted public key infrastructure certificate via an inter-process communication channel, the authenticated client identification;

associating the authenticated client identification with the second randomly generated string of alpha-numeric characters previously received from the server application, and the randomly generated endpoint address of the first named pipe; and transmitting the randomly generated endpoint address to the server application and the authenticated client application and transmit the second randomly generated string of alpha-numeric characters to the authenticated client application.

11. The method of securing a local inter-process communication by performing a verification process of a candidate client application of claim 8 further comprising repeating the verification process of the candidate client application upon receiving a request from the candidate client application for a second communication session with the server application.

12. The method of securing a local inter-process communication by performing a verification process of a candidate client application of claim 10 wherein the authenticated client application only enters into the first communication session with the server application after receiving verification from a PKI that the server application is associated with a verified PKI certificate having an authentic signature.

13. The method of securing a local inter-process communication by performing a verification process of a candidate client application of claim 10 wherein the inter-process communication channel is a second named pipe.

14. The method of securing a local inter-process communication by performing a verification process of a candidate client application of claim 8 wherein the candidate client application code instructions are executed in a restricted operating system environment.

15. An information handling system operating a local inter-process communication securing system comprising:
   a memory;
   a processor executing machine readable code instructions of the local inter-process communication securing system performing a verification process of a candidate client application to:
      receive from an authenticated client application associated with a trusted public key infrastructure certificate via an inter-process communication channel, an authenticated client identification;
      associate the authenticated client identification with a first randomly generated string of alpha-numeric characters previously received from a server application for which the local inter-process communication securing system acts as an API, and a randomly generated endpoint address of a first named pipe;
      transmit the randomly generated endpoint address to the server application and the authenticated client application and transmit the first randomly generated string of alpha-numeric characters to the authenticated client application;
      receive a candidate client identification and a second randomly generated string of alpha-numeric characters from the server application; and
      instruct the server application to establish a first communication session, via the first named pipe, with the candidate client application upon determining the candidate client identification matches the authenticated client identification and that the second randomly generated string of alpha-numeric characters matches the first randomly generated string of alpha-numeric characters, as stored at the local inter-process communication securing system, to verify that the candidate client application is the authenticated client application.

16. The information handling system operating the local inter-process communication securing system of claim 15 further comprising the processor executing machine readable code instructions of the local inter-process communication securing system to instruct the server application to immediately disconnect the first named pipe upon determining the candidate client identification either does not match the authenticated client identification or that the first randomly generated string of alpha-numeric characters does not match the second randomly generated string of alpha-numeric characters, as stored at the local inter-process communication securing system.

17. The information handling system operating the local inter-process communication securing system of claim 15 further comprising the processor executing machine readable code instructions of the local inter-process communication securing system to repeat the verification process of the candidate client application upon receiving a request from the candidate client application for a second communication session with the server application.

18. The information handling system operating the local inter-process communication securing system of claim 15 wherein the inter-process communication channel is a socket connection.

19. The information handling system operating the local inter-process communication securing system of claim 15 wherein the inter-process communication channel is a second named pipe.

20. The information handling system operating the local inter-process communication securing system of claim 15 wherein the candidate client application code instructions are executed in a restricted operating system environment.

* * * * *